R. HAZELRIGG.
INSECT TRAP.
APPLICATION FILED JAN. 2, 1909.
942,204.
Patented Dec. 7, 1909.
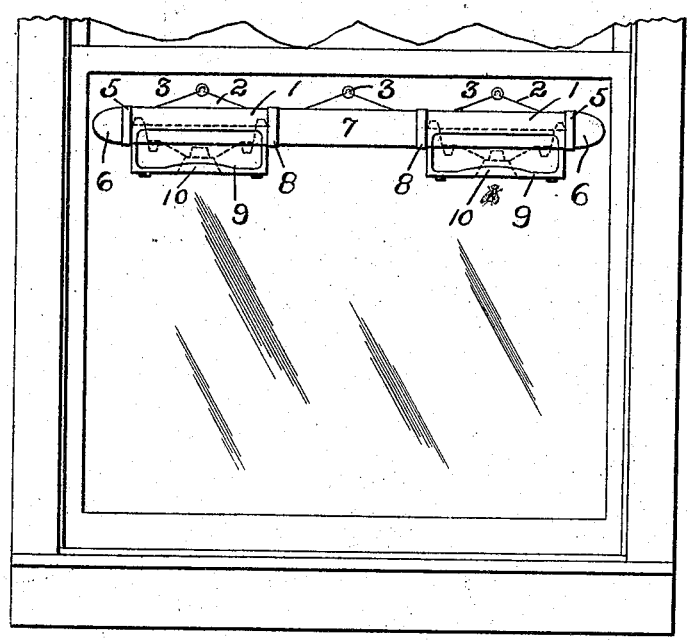
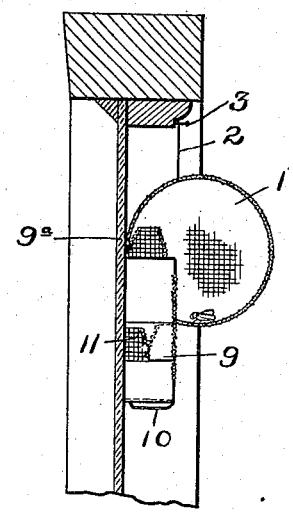
Fig. 2.
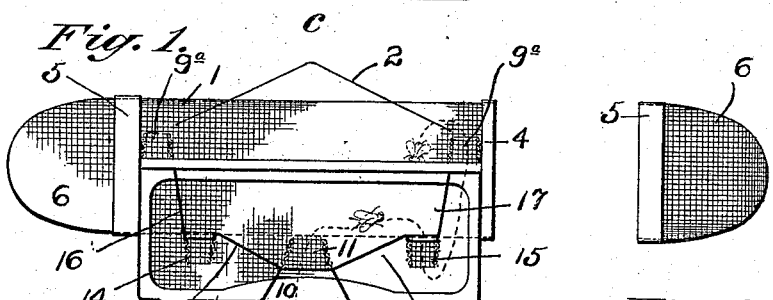
Fig. 3.
Fig. 4.
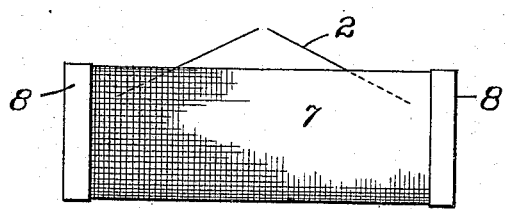
Fig. 5.
WITNESSES:
Chas. E. Chapin
J. Stewart Rice
INVENTOR
Ross Hazelrigg.
BY
E. E. Vrooman,
his ATTORNEY.

UNITED STATES PATENT OFFICE.

ROSS HAZELRIGG, OF OAKLAND, CALIFORNIA.

INSECT-TRAP.

942,204.   Specification of Letters Patent.   Patented Dec. 7, 1909.

Application filed January 2, 1909. Serial No. 470,443.

*To all whom it may concern:*

Be it known that I, Ross HAZELRIGG, a citizen of the United States, residing at Oakland, in the county of Alameda and State of California, have invented certain new and useful Improvements in Insect-Traps, of which the following is a specification, reference being had therein to the accompanying drawing.

This invention relates to insect traps especially adapted for attachment to a window, and has specially in view an improvement in the body of the same whereby it may be used for windows of various sizes, and also in the arrangement of the entrance to said body which will insure of the insects being guided to the interior of said body in a manner that will preclude any escape therefrom.

In carrying out the objects of the invention generally stated above, it will, of course, be obvious that changes in details and structural arrangements may be resorted to, a preferred and practical embodiment of which is shown in the accompanying drawings, wherein—

Figure 1 is a front elevation of a window showing the improved trap connected thereto. Fig. 2 is a central vertical sectional view of the same. Fig. 3 is a rear view of the trap. Fig. 4 is a side elevation of one of the end caps used in connection with the body of the trap. Fig. 5 is a detail side elevation of the body of the trap.

Like characters of reference designate corresponding parts in the several figures of the drawings.

Referring to the accompanying drawings, 1 designates the body of the trap which is substantially cylindrical in shape and which may be provided with a cord or the like 2 for suspending the same from a hook 3 carried by the window pane or the window sash bar. The said body has open ends which are surrounded by an external collar 4 forming a seat for a similar collar 5 carried by an end cap 6. In Fig. 1 of the accompanying drawings the improved trap has been shown suspended from a window pane, said trap having its body elongated by means of a connecting thimble 7 that has end collars 8 fitting over the end collars of two trap bodies. This type of trap is especially adapted for use on large windows. It will, of course, be readily understood that the connecting thimble may be omitted when a small trap is desired, or necessary, in which case but one of the bodies would be used and both ends of the same would be closed by the end caps 6. The said body carries a substantially rectangular shaped frame 9 forming a guiding entrance to said body, the upper part of said frame extending into said body and being provided with upstanding side cones $9^a$ which communicate with the interior of the body as shown in Fig. 2 of the accompanying drawings. The lower part of said frame projects below the lower plane of the body of the trap and is provided with a central sheet-metal entrance 10 which communicates with a tapering wire entrance 11 the smaller end of which communicates with the upper part of said frame. Diverging partition plates 12 and 13 extend from the entrance 10 to tapering passageways 14—15 at each end of the lower part of said frame, said last mentioned passageways in turn having partition plates 16 and 17 which extend to the upper end cones $9^a$. The described arrangement of partition plates divides said entrance frame into an upper chamber, and two side chambers, as is shown more clearly in Fig. 3 of the accompanying drawings, and in said figure the path taken by the insects has been indicated by dotted or broken lines. The entrance frame may be open at one side, as indicated in Fig. 2 of the accompanying drawings, the window or other back support therefor forming the closing means for the same.

In Fig. 1 of the accompanying drawings the trap has been shown suspended from the window pane, the hooks for the attachment thereof being of the gummed back type. In Fig. 3 the suspension hooks are of the ordinary screw type and are carried by the sash bar. These described suspension means are but two of many varieties that may be used.

In applying the trap to the window, the same is preferably arranged so that it will be near the top. This arrangement being preferable on account of the well known habits of insects crawling up a window when attempting to escape therethrough. Owing to the described shape of the entrance frame of the trap, the same will lie close to the window pane with its entrance in such a position that the insects will readily enter and take the course indicated in dotted lines in Fig. 3 and finally get to the trap body. When the said body becomes filled with insects, or when it is desired to get access thereto, the end caps may be readily slipped off the end collars, so as to empty the insects, or clean the body.

It will be readily understood from the foregoing description that the present invention is one that may be readily attached to a window, wall, or like place so as to be in position to catch the insects, and also through the described thimble connection, one or more traps may be readily coupled together when it is desired to increase the size of the trap.

Claims:—

1. A device of the character described comprising a cylindrical body portion, removable closing means for the ends thereof, an entrance frame carried by said body portion, and having one portion extending into the interior thereof, partition plates carried by said frame and dividing the same into two chambers, a passageway communication between the entrance frame and one of said chambers, end passageways forming communication between the two chambers, and cones communicating with said body portion and said chambers.

2. A device of the character described comprising a body portion, removable closing means for the ends thereof, an entrance frame carried by said body and communicating with the interior thereof, partition plates dividing said frame into an upper and a lower chamber, a tapering entrance communicating with said upper chamber, side guides forming a passageway from said upper chamber to said lower chamber, and upper cones forming a passageway from said lower chamber to the interior of the said body.

3. A device of the character described comprising a body portion substantially cylindrical in shape and carrying an entrance frame, end collars carried by said body, an end cap provided with a collar adapted to be seated over the collar at one end of the body, and a connecting thimble provided with an end collar adapted to be seated over the other end of said body.

4. An insect trap comprising a body having an entrance thereto and having its ends provided with collars, a connecting thimble having one end adapted to be fitted over one of the ends of said body, and its other end adapted to be fitted over a similar end of another trap body, and end caps for sealing the free ends of said bodies.

5. A device of the character described comprising a body, an entrance frame therefor having a tapering passageway communicating with its interior, diverging plates dividing said frame into upper and lower chambers, side cones forming passageways between said chambers, end cones forming a communication between the lower chamber and the body, and partition plates for guiding insects from the lower chamber to the said end cones.

In testimony whereof I hereunto affix my signature in presence of two witnesses.

ROSS HAZELRIGG.

Witnesses:
  Wm. Drew,
  H. C. Schroeder.